May 28, 1968      J. ADAMS, JR      3,385,096
SLIP STEP PULLEY DYNAMOMETER FOR TESTING BELTS
Filed June 29, 1966      2 Sheets-Sheet 2
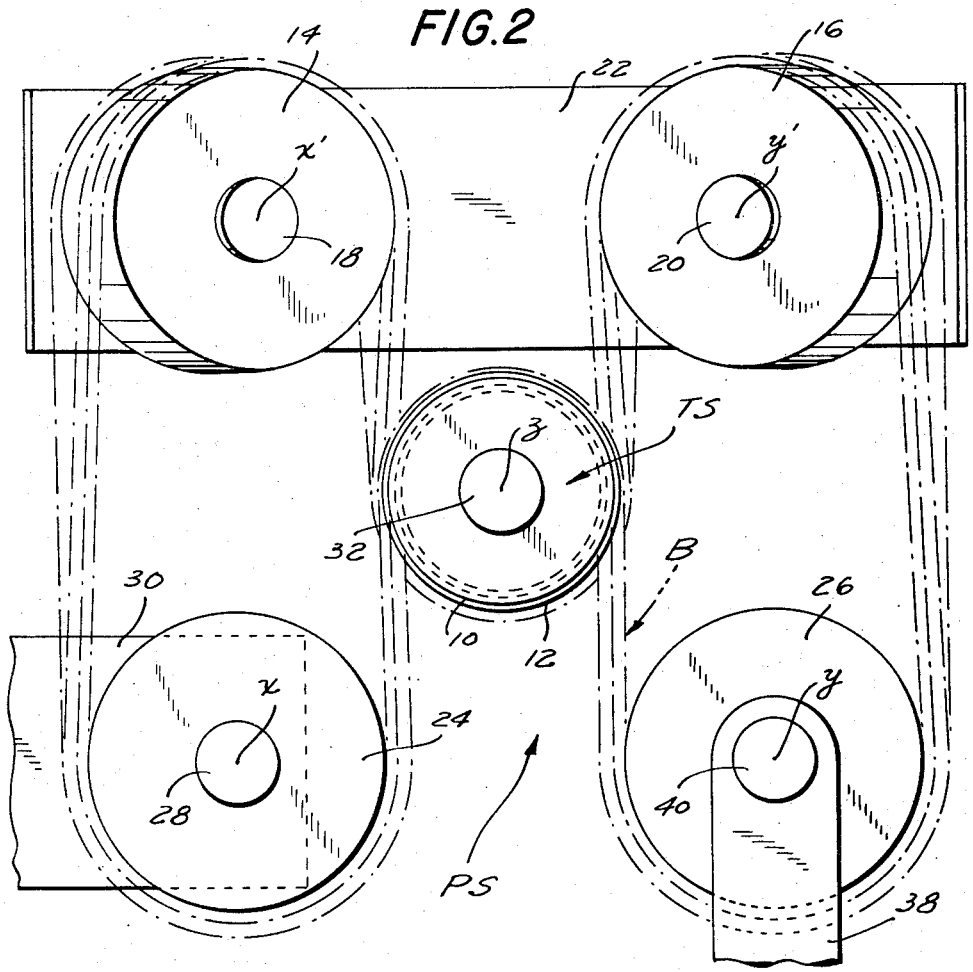
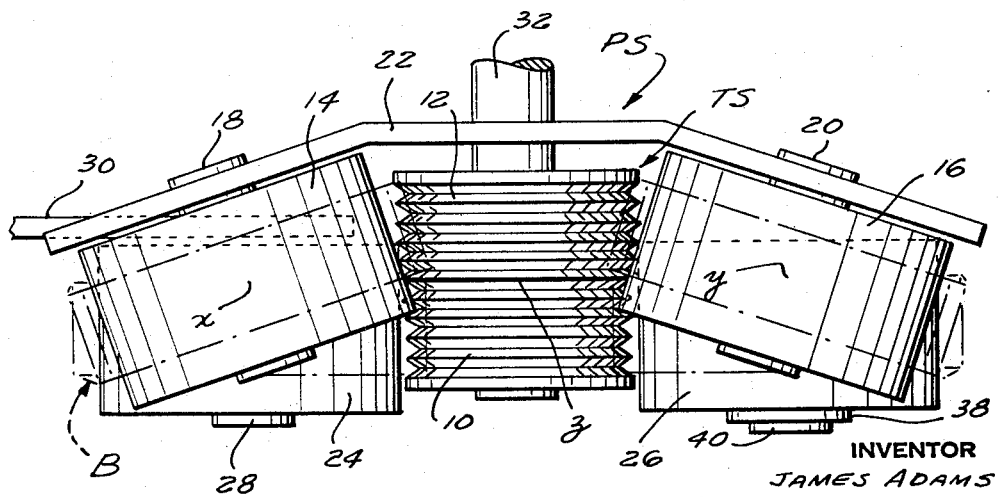
INVENTOR
JAMES ADAMS, JR.
BY
ATTORNEY

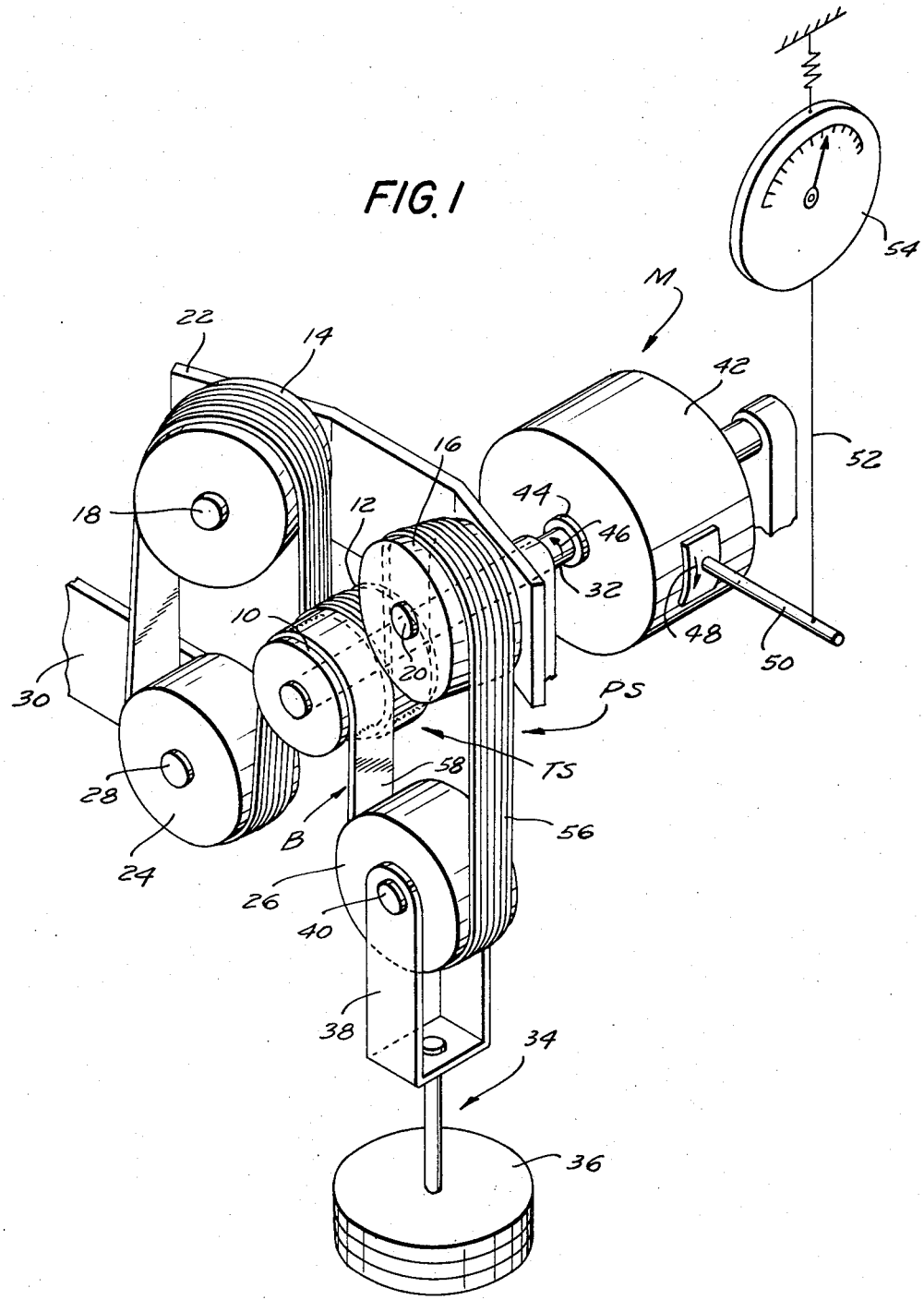

United States Patent Office 3,385,096
Patented May 28, 1968

3,385,096
SLIP STEP PULLEY DYNAMOMETER FOR TESTING BELTS
James Adams, Jr., Packanack Lake, N.J., assignor to Raybestos-Manhattan, Inc., Passaic, N.J., a corporation of New Jersey
Filed June 29, 1966, Ser. No. 561,601
6 Claims. (Cl. 73—9)

ABSTRACT OF THE DISCLOSURE

A belt testing machine characterized by achieving a forced slip imparted to the test belt by means of a pulley system over which the belt is trained, the pulley system including a two-step motor operated pulley, half of the motor pulley face (one step of the two-step pulley) being larger in diameter than the other half (the other step of the two-step pulley) by the desired percentage of slip, the steps of the two-step pulley thus having a difference in diameter selected for introducing a forced predetermined slip to the movement of the belt. The other pulleys of the system are for the purpose of training the belt path, one of these other pulleys being employed for applying and regulating the tension applied to the belt. The belt speed is regulated by the speed of revolution of the motor and the step pulley diameters.

---

This invention relates to a belt testing machine and more particularly to a slip step pulley dynamometer for testing belts.

Laboratory pre-testing of power transmission belts is a necessary but costly operation of development and quality control in the manufacture of the belts. The object of belt testing is to reproduce the factors or elements that wear and fatigue the belt, these factors or elements being the belt speed, slip, tension, flexing and torque. In a belt testing machine, a power load is put through the belt until the belt fails to transmit the power. Accurate measurements are made by the testing machine of speed, slip, tension, stretch and power.

Customary belt testing machines are structurally complicated and are operated at a high power cost. The usual test machine consists of a drive motor and a water brake, an eddy current brake or an electric generator driven by the motor through the test belt. Where the power transmitted is electrically fed back into the supply line, the equipment used is quite costly; and where the power transmitted by the belt is wasted, the power cost may be quite high. For example, the usual belt test dynamometer wastes all the power put out by the motor; thus if a 10 horsepower motor is used, then 10 horsepower of energy is wasted. Also, the test machine motor bearings in all such dynamometers must be large enough to stand the total maximum tension expected from belt pull; because of this, oversized motors are usually necessary to have adequate bearing capacity.

The prime object of the present invention relates to a belt testing machine which, contrasting with known machines, is characterized by (a) simplicity of structure (and is consequently inexpensive in design); (b) the ability of yielding accurate regulation of the test factors or elements; and (c) operability at a very low power cost.

The belt testing machine of the present invention is characterized in its prime essence by achieving the forced slip imparted to the test belt by means of a pulley system over which the belt is trained, the pulley system including a two-step motor operated pulley, half of the motor pulley face (one step of the two-step pulley) being larger in diameter than the other half (the other step of the two-step pulley) by the desired percentage of slip, the steps of the two-step pulley thus having a difference in diameter selected for introducing a forced predetermined slip to the movement of the belt. The other pulleys of the system are for the purpose of training the belt path, one of these other pulleys being employed for applying and regulating the tension applied to the belt. The belt speed is regulated by the speed of revolution of the motor and the step pulley diameters. Belt friction grip is measured by the reaction torque of the motor frame which is freely revolvable on the motor shaft. Thus all of the test factors or elements are present, namely slip, tension, speed, torque and flexing, and these are accurately controlled without costly equipment, expensive instrumentation, or waste of power beyond the slip and flexing power losses of the belt (under 5% of the power capability of the belt). Also there is practically zero net pull on the motor shaft, so that the motor size need only be enough to handle the small power requirement represented by the slip and flexing power losses of the belt.

To the accomplishment of the foregoing objects and such other objects as may hereinafter appear, the invention relates to a belt testing machine as hereinafter defined in the appended claims taken together with the following specification and the accompanying drawings, in which:

FIG. 1 is a perspective view of the slip step pulley dynamometer for the testing of belts embodying the principles of the present invention;

FIG. 2 is a vertical elevation of the pulley system thereof; and

FIG. 3 is a plan view of the pulley system thereof.

Referring now more in detail to the drawings, the belt testing machine of the invention comprises in its main essence a pulley system generally designated as PS over which a belt B to be tested is trained, one of the pulleys of the system comprising a two-step generally designated as TS, a motor M connected for positively driving the two-step pulley TS, the rotating speed of the motor and the diameters of the two-step pulley in the system determining the speed of movement of the belt under test, the steps 10 and 12 of the two-step pulley TS having a difference in diameter selected for introducing a forced predetermined slip to the movement of the belt B under test.

The other pulleys of the pulley system PS comprise two top pulleys 14 and 16 rotatable on fixed centers 18 and 20 respectively mounted on a fixed support 22 and two bottom pulleys 24 and 26, the pulley 24 being rotatable on a fixed center 28 and mounted on a fixed support 30 and the pulley 26 comprising a floating pulley. The two-step pulley TS fixed to the shaft 32 of the motor M is arranged as shown intermediately of the set of top pulleys 14, 16 and the set of bottom pulleys 24, 26. The belt B is trained over the described pulleys of the pulley system as clearly indicated, for example, in FIG. 1 of the drawings.

The floating pulley 26 functions for applying tension on the belt B, this being effected by employing means generally designated as 34 for applying a force to said floating pulley. This force applying means may appropriately comprise a pendulus regulatable weight 36 suspended by means of the U-shaped hanger 38 fixed to the shaft 40 of the floating pulley 26.

The means provided for measuring the friction grip on the belt B under test comprises a motor frame 42 freely revolvable on the motor shaft 32 by means of the trunnions 44 and means for measuring the torque reaction of said motor which is effective on said motor frame by the rotation of the motor. The motor, rotatable in the direction of the arrow 46 imparts a torque reaction on the motor frame in the opposite direction indicated by the arrow 48. The means for measuring the torque reaction effective on the motor frame comprises a rod or bar 50 fixed to the motor frame which is connected by a pull wire or similar means 52 to a torque measuring meter 54.

The arrangement and measured disposition of the pulleys of the pulley system are depicted in FIGS. 2 and 3 of the drawings. In the exemplification of the structure shown in these figures the diameter of the smaller pulley step 10 is 1.700 inches and the diameter of the larger pulley step 12 is 1.770 inches. The diameter of each of the other pulleys of the system, namely 14, 16, 24, and 26, in 2¼ inches; the width of the face of each of these pulleys is 1¼ inches; and the distance between the body centers of the upper and lower pulleys, namely the distance between the centers $x$ and $y$ (FIG. 3) is 4 inches, the distance between each of said body centers and the central axis of the motor shaft 32, designated as $z$ being 2 inches. Also the vertical distance between each of the pulley centers $x$ and $y$ and the shaft center $z$ is 2 inches. And correspondingly the vertical distance between the centers $x'$ and $y'$ of the upper pulleys 14 and 16 and the center $z$ of the shaft 32 is also 2 inches.

As will be apparent the pulleys 14 and 16 are arranged at an angle (as shown) with reference to the pulleys 24 and 26 for the purpose of training the bights of the belt B over the two steps 10 and 12 of the two-step pulley TS.

In the exemplification of the invention shown in the drawings the pulley system is devised for the testing of V-belts and particularly multi-V belts known as "Poly-V" belts. For this purpose the pulley steps 10 and 12 each comprises grooved pulleys as best portrayed in FIGS. 1 and 3 of the drawings. The remaining pulleys of the system, however, namely pulleys 14, 16, 24 and 26, are flat faced pulleys. The belt B as illustrated is a "Poly-V" belt of the type disclosed in my Patent No. 2,728,239, of Dec. 27, 1955, one face 56 of said belt having alternating ribs and grooves and the other face 58 of said belt being flat. It will be noted that in training the "Poly-V" belt over the pulleys of the system disclosed, the flat face of the belt B is trained over and is in contact with the flat faces of the training pulleys (14, 16, 24 and 26) while the two bights of the rib and groove face 56 of the belt B are in engagement with and are trained over the grooves of the grooved pulley steps 10 and 12.

The structure and use of the slip step pulley dynamometer of the present invention and the functions and advantages thereof over belt testing machines heretofore employed will be fully apparent from the above detailed description of its structure, purpose and function.

It will be apparent that many changes may be made in the structure and arrangement of the parts of the belt testing machine herein disclosed without departing from the spirit of the invention defined in the following claims.

I claim:

1. A belt testing machine embodying a pulley system over which a single belt to be tested is trained, said pulley system comprising a two-step pulley and a plurality of pulleys arranged in relation to the two-step pulley for training the path of said belt under test, the test belt being trained over all of the said pulleys of the system including the separate steps of the two-step pulley, a motor connected for positively driving the two-step pulley, the rotative speed of the motor and the diameter of the two-step pulley in the system determining the speed of movement of the said single belt under test, the steps of the two-step pulley having a difference in diameter selected for introducing a forced predetermined slip to the movement of the said single belt under test, and means for applying a given tension to the said belt.

2. In the belt testing machine of claim 1, means for measuring the friction grip on the belt under test comprising a motor frame freely movable on the motor shaft and means for measuring the torque reaction of said motor effective on said motor frame by the rotation of the motor.

3. In the belt testing machine of claim 1, the means for applying the tension on the belt comprising a floating pulley in the pulley system and means for applying a force to said floating pulley.

4. The belt testing machine of claim 1 in which the steps of the two-step pulley each comprises a groove faced pulley and each of the remaining pulleys of the pulley system comprises a flat faced pulley, the belt to be tested being a V-belt, the V face of the V-belt being trained over the grooved faced pulleys and the flat face of the V-belt being trained over the flat faced pulleys.

5. The belt testing machine of claim 3 in which the pulley system comprises a group of five pulleys consisting of two top pulleys, two bottom pulleys and one intermediately arranged pulley, the two top pulleys having fixed centers, one of the two bottom pulleys having a fixed center and the other of the bottom pulleys being the floating pulley, and the intermediately arranged pulley being the two-step pulley.

6. The belt testing machine of claim 3 in which the pulley system comprises a group of five pulleys consisting of two flat faced top pulleys, two flat faced bottom pulleys and one intermediately arranged pulley, the two top pulleys having fixed centers, one of the two bottom pulleys having a fixed center and the other of the bottom pulleys being the floating pulley, and the intermediately arranged pulley being the two-step pulley, each step of which comprises a groove faced pulley.

References Cited

UNITED STATES PATENTS

| | | | |
|---|---|---|---|
| 1,749,297 | 3/1930 | Norman | 73—7 |
| 2,603,084 | 7/1952 | Waddell | 73—9 XR |
| 3,209,589 | 10/1965 | Schlatter | 73—160 |
| 3,229,510 | 1/1966 | Bodemeijer | 73—9 XR |

DAVID SCHONBERG, *Primary Examiner.*

JEFFREY NOLTON, *Assistant Examiner.*